United States Patent
May et al.

(10) Patent No.: US 6,877,621 B1
(45) Date of Patent: Apr. 12, 2005

(54) STORAGE COVER APPARATUS

(75) Inventors: Tom May, Fort Worth, TX (US); Mark Ritchmond, Granbury, TX (US); Rick Sherwood, Southlake, TX (US); Steve Wesstrom, Arlington, TX (US)

(73) Assignee: Miramar Designs, Inc., Fort Worth, TX (US)

( * ) Notice: Subject to any disclaimer, the term of this patent is extended or adjusted under 35 U.S.C. 154(b) by 0 days.

(21) Appl. No.: 10/442,624

(22) Filed: May 21, 2003

(51) Int. Cl.⁷ .................................................. A47F 5/00
(52) U.S. Cl. ..................... 211/183; 211/99; 211/104; 40/601; 40/651
(58) Field of Search ..................... 211/104, 99, 183, 211/189; 40/601, 651

(56) References Cited

U.S. PATENT DOCUMENTS

| | | | | |
|---|---|---|---|---|
| 5,170,829 A | * | 12/1992 | Duncan et al. .......... | 160/84.02 |
| 5,526,944 A | * | 6/1996 | Merl ....................... | 211/87.01 |
| 5,924,367 A | * | 7/1999 | Henke et al. ............ | 108/108 |
| 6,003,697 A | * | 12/1999 | Ferchat et al. ........... | 211/189 |
| 6,234,329 B1 | * | 5/2001 | Loew ...................... | 211/104 |
| 6,318,684 B1 | * | 11/2001 | Ireland et al. ............ | 248/201 |
| 6,434,871 B2 | * | 8/2002 | Conway ................... | 40/651 |
| 6,457,689 B1 | * | 10/2002 | Padiak et al. ............ | 248/291.1 |
| 6,470,611 B1 | * | 10/2002 | Conway et al. .......... | 40/606.14 |
| 6,665,969 B1 | * | 12/2003 | Conway ................... | 40/605 |
| 6,722,512 B2 | * | 4/2004 | Scully ...................... | 211/183 |

\* cited by examiner

Primary Examiner—Robert W. Gibson, Jr.
(74) Attorney, Agent, or Firm—Geoffrey A. Mantooth; Arthur F. Zobal

(57) ABSTRACT

The apparatus includes a frame having a base and two guide posts coupled to opposite ends of the base forming a U-shaped member. The base may be attached to a stock shelf with the U-shaped frame located on the front portion of the shelf. Moveably coupled to the guide posts is a cover panel which may be moved to a closed position covering the space between the two guide posts and to a lower open position or to an upper open position to allow access to the shelf by way of the opening between the two guide posts.

4 Claims, 10 Drawing Sheets

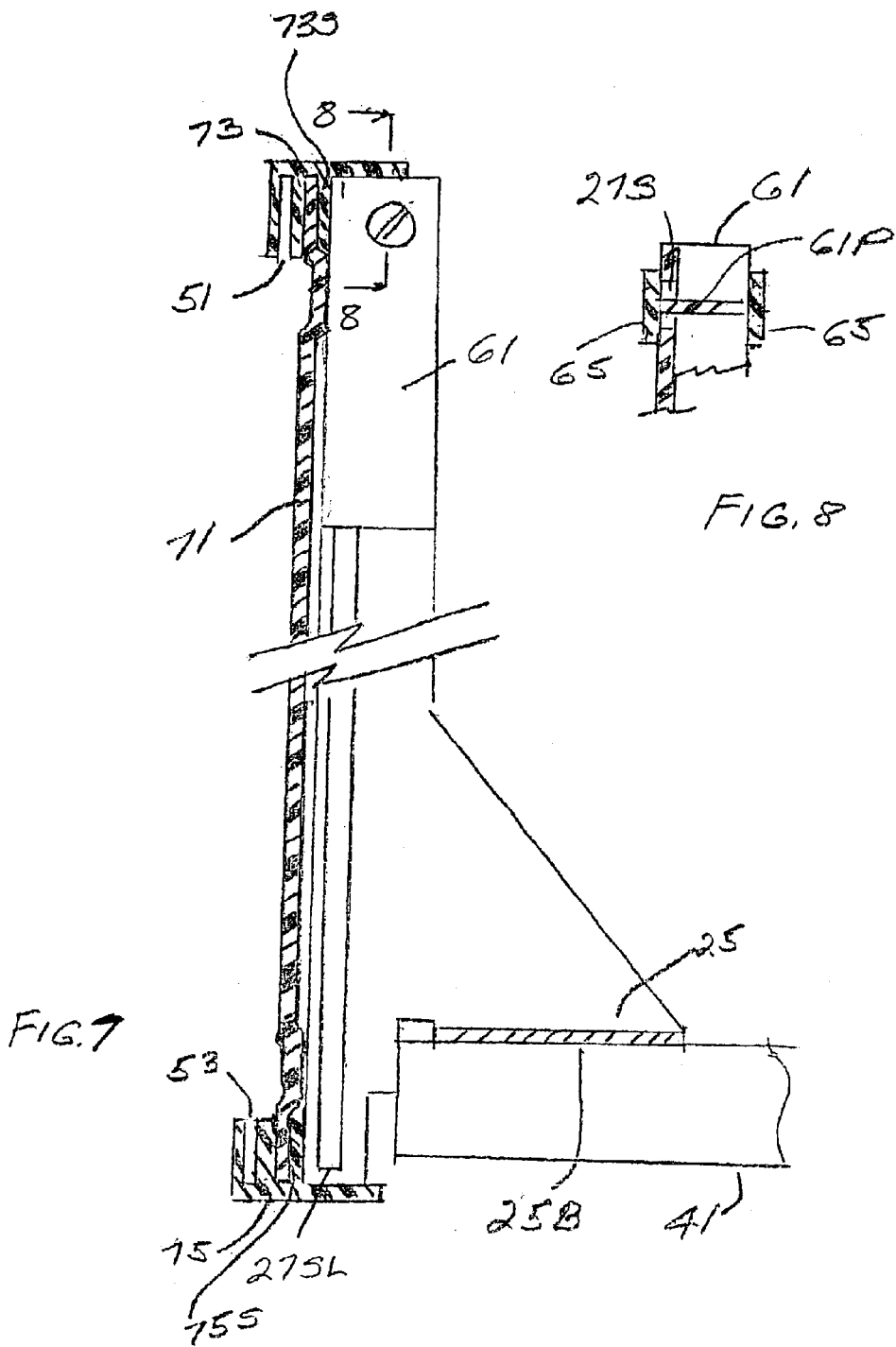

STORAGE COVER APPARATUS

BACKGROUND OF THE INVENTION

1. Field of the Invention

The invention relates to a movable cover for a stock shelf.

2. Description of the Prior Art

SUMMARY OF THE INVENTION

It is an object of the invention to provide an apparatus for a stock shelf having a cover panel for covering the stock on a shelf when not needed and which cover panel can be readily moved out of the way when desired, to allow access to the shelf.

The cover panel has means on its outside to support graphics for advertisement or other messages.

In the embodiment disclosed, the apparatus comprises a frame having a base to be attached to the shelf and two spaced apart guide posts extending from the base. The cover panel is coupled to the posts for movement from a closed position to a lower open position or to an upper open position.

In a further aspect, the two guide posts have slots formed therethrough for receiving pins coupled to opposite sides of the cover panel for guiding movement of the cover panel.

BRIEF DESCRIPTION OF THE DRAWINGS

FIG. 7 is an enlarged cross-sectional view of FIG. 6 as seen along lines 7—7.

FIG. 8 is a cross-sectional view of FIG. 7 as seen along lines 8—8.

DETAILED DESCRIPTION OF THE INVENTION

Figure 1:
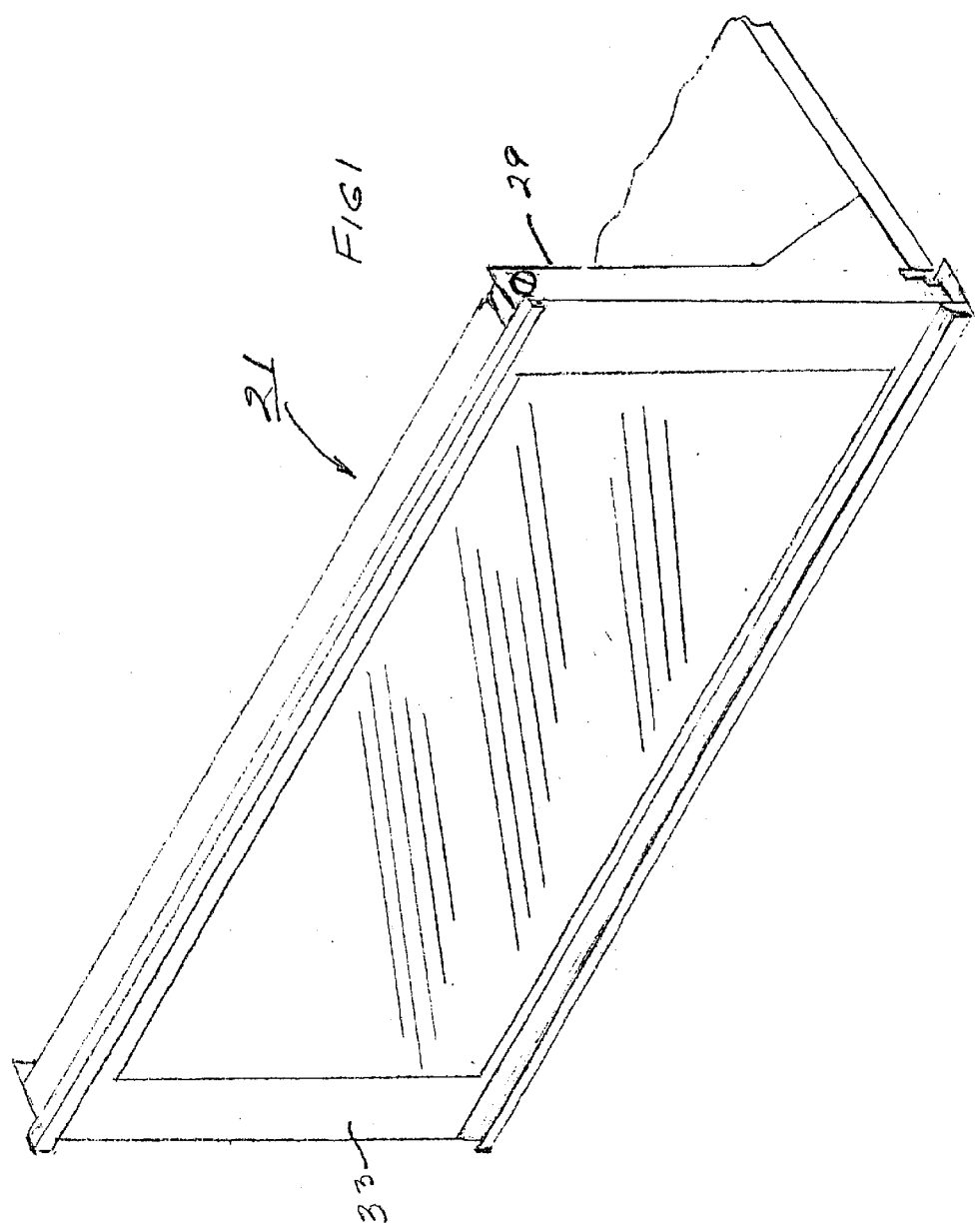
FIG. 1 is an isometric schematic view of the apparatus of the invention with its cover panel in a closed position.
Figure 2:
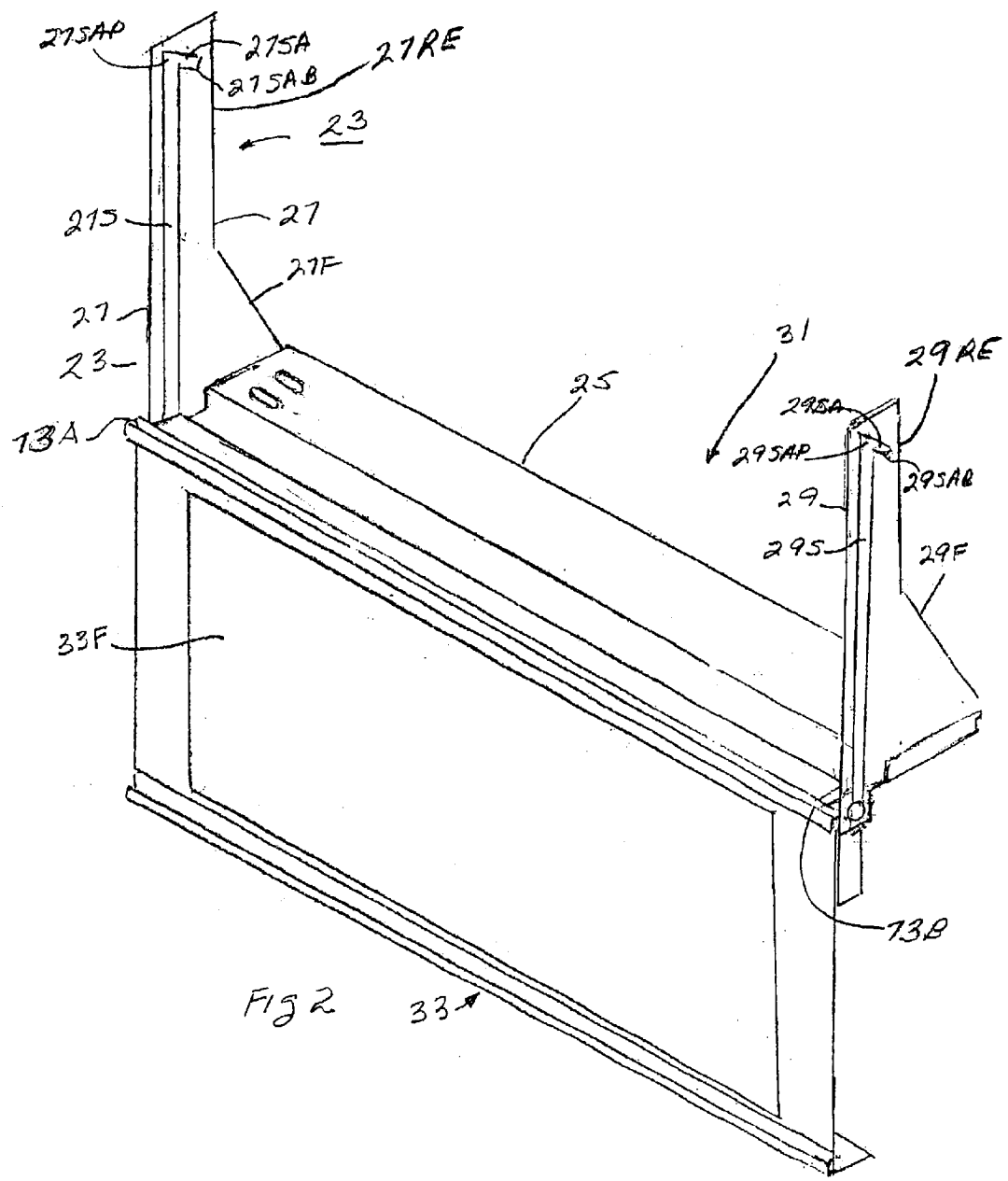
FIG. 2 is an isometric schematic view of the apparatus of FIG. 1 with its cover panel in a lower open position.

Referring now to the drawings, the apparatus of the invention is identified at 21. It comprises a metal frame 23 having a base 25 and two guide posts 27 and 29 coupled to opposite ends of the base forming a U-shaped member having an opening or passage 31 formed between the base 25 and guide posts 27 and 29. Coupled to the front of the guide posts 27 and 29 is a cover panel 33 supported for movement between a closed position as shown in FIG. 1 and a lower open position as shown in FIG. 2. In the closed position, the panel blocks the opening 31 and in the open position the panel is moved downward from the opening 31.

The rears of the guide posts 27 and 29 flare downward and rearward at 27F and 29F with the flat base 25 extending between the lower edges of the flared portions 27F and 29F. The base 25 has two sets of elongated holes 25H formed therethrough such that the bottom 25B of the base 25 may be placed on a stock shelf 41 and secured thereto by bolts 43. In the closed position the flat portion 33F of the panel 33 will be located in a plane in front of the base 25 and the guide posts 27 and 29, and hence in front of the shelf 41. Thus when the cover panel is in its closed position, the opening 31 is closed and stock on the shelf behind the cover panel 33 cannot be seen by someone on the front side of the cover panel 33.

The cover panel 33 has two recesses 51 and 53 on its outer portion at its upper and lower edges for holding an advertising sheet which is displayed when the cover panel is in its closed upper position or lower open position. In order to retrieve stock on the shelf 41 the cover panel 33 is lowered to expose the passage or opening 31 between the two guide posts 27 and 29 to allow personnel to remove or place stock items from or on the shelf 41.

The manner in which the cover panel 33 is coupled to the two guide posts 27 and 29 now will be described. Guide posts 27 and 29 have straight elongated slots 27S and 29S which sharply changes directions at their upper ends and angles at 27SA and 29SA sharply downward and rearward. Support members 61 and 63 are secured to the back side of the panel 33 at its upper and outward edges and which holds pins 61P and 63P which extends through the slots 27S and 29S. Pin 61P has caps 65 secured to its ends to hold the pin 61P in its support 61 and in slot 27S and pin 63P has caps 67 secured to its ends to hold the pin 63P in it support 53 and in slot 29S.

Thus the supports 61 and 63 hold the pins 61P and 63P to the panel cover 33 but allow the pins 61P and 63P to move in the slots 27S and 29S which guide and allows the cover panel 33 to move to its upper closed and lower open positions. In the lower open position of the panel cover 33, the pins 61P and 63P engage the lower ends 27SL and 29SL of the slots 27S and 29S and support the cover panel its lower open position. The panel cover 33 may be moved to its upper position by moving the panel 33 upward until the pins 61P and 63P are in the apexes 27SAP and 29SAP of the slots 27S and 29S at which points the pins 61P and 63P may be moved rearward and downward in the angled portions 27SA and 29SA until the pins 61P and 63P engage the bottom portions 27SAB and 29SAB of the angled slots 27SA and 29SA which then hold the panel cover 33 in its upper closed position.

Figure 3:
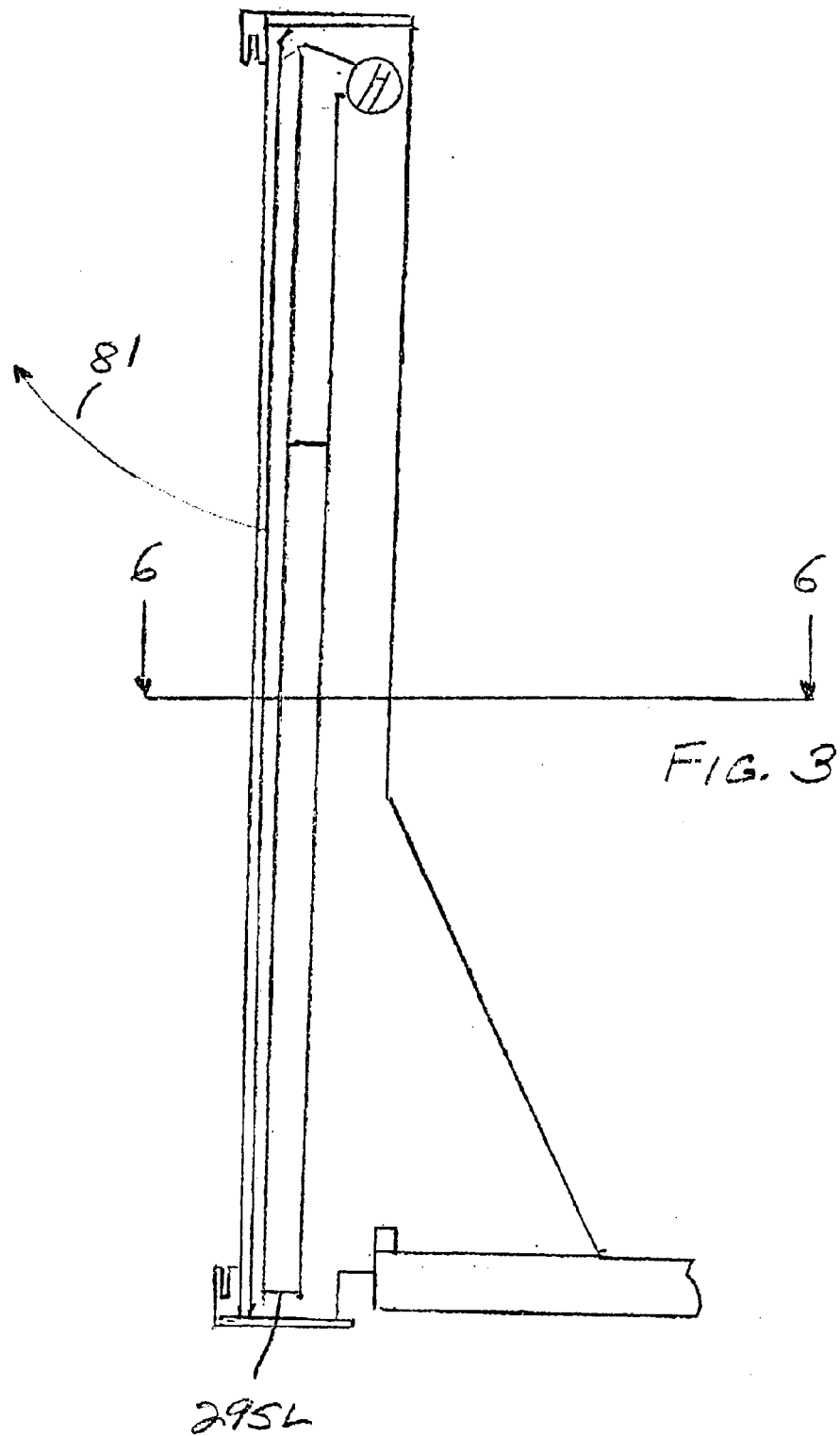
FIG. 3 is a side view of the apparatus of FIG. 1 with the cover panel in a closed position
Figure 4:
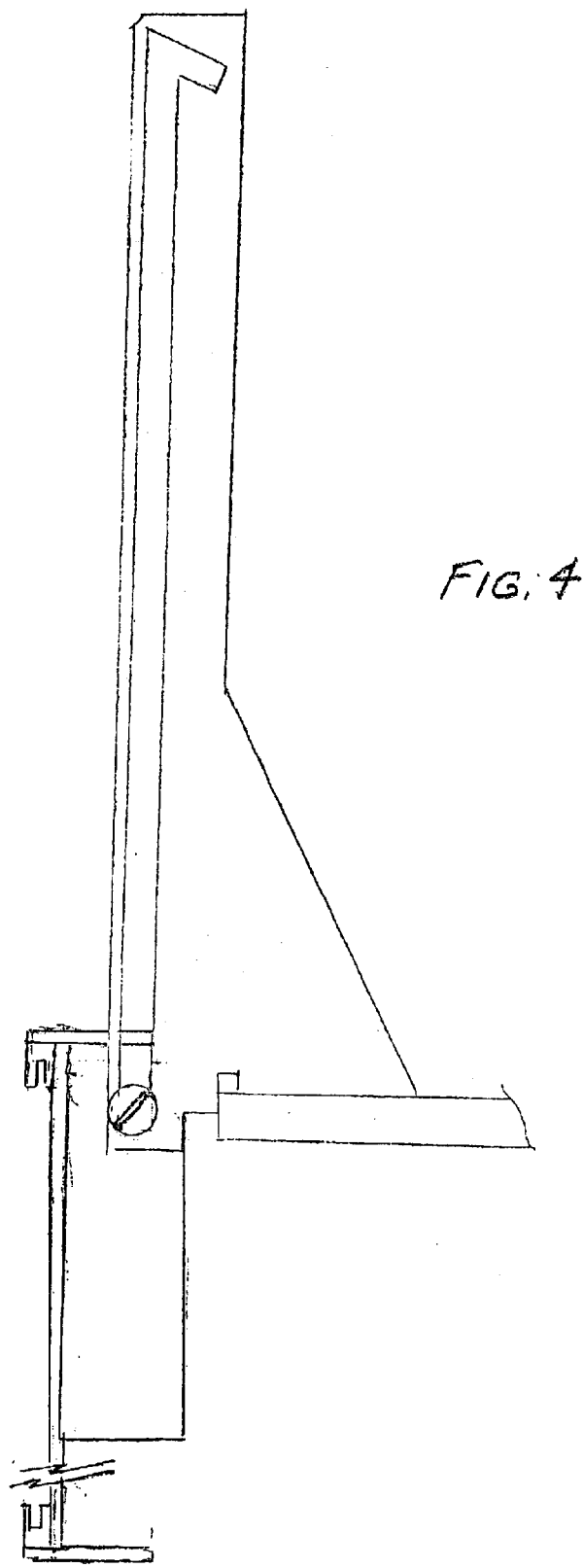
FIG. 4 is a side view of the apparatus of FIG. 1 with the cover panel in a lower open position.
Figure 5:
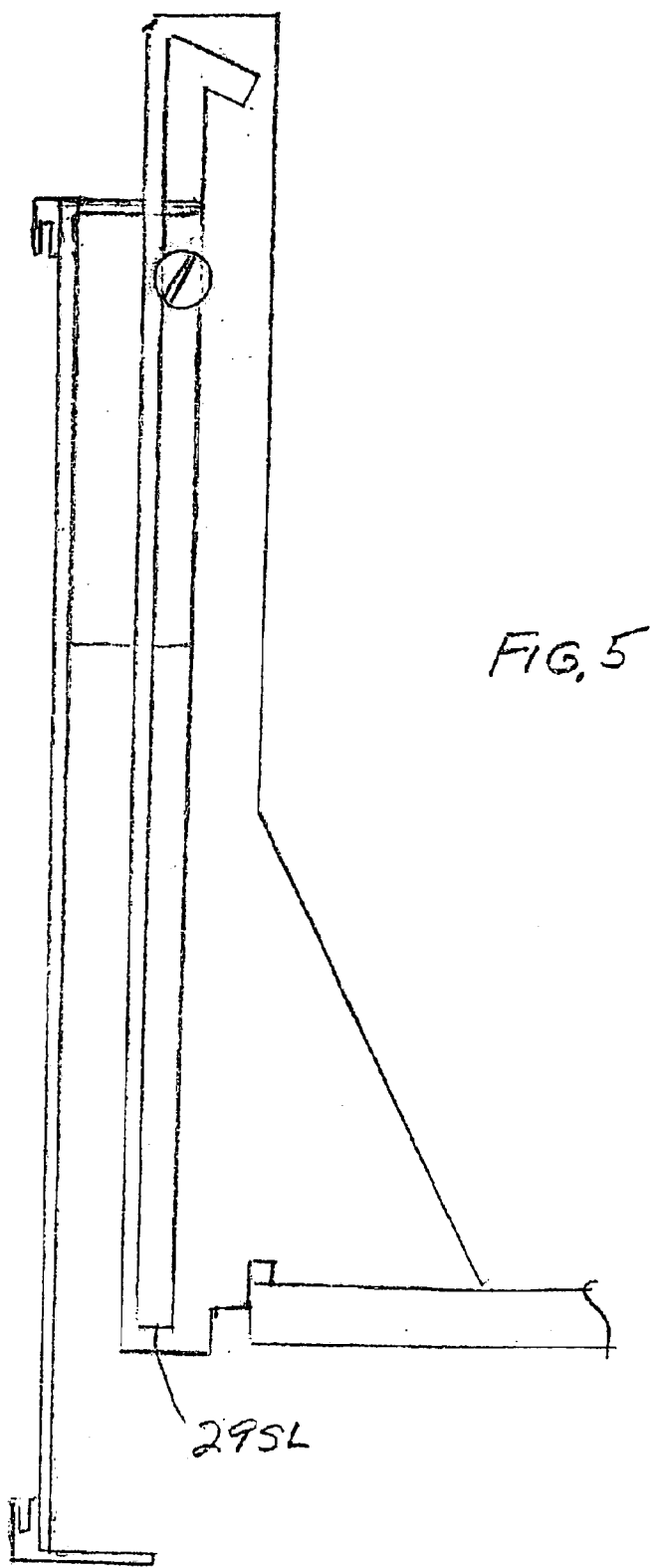
FIG. 5 is a side view of the apparatus with the cover panel between the closed and lower open positions.
Figure 6:
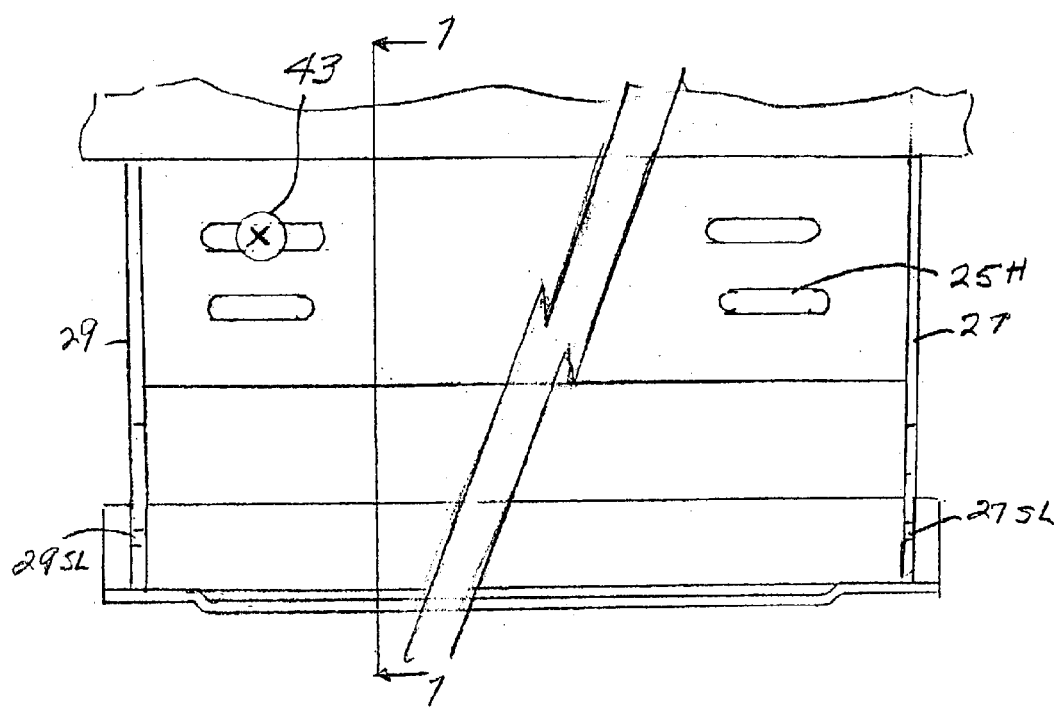
FIG. 6 is a cross-sectional view of FIG. 3 as seen along lines 6—6.
Figure 9:
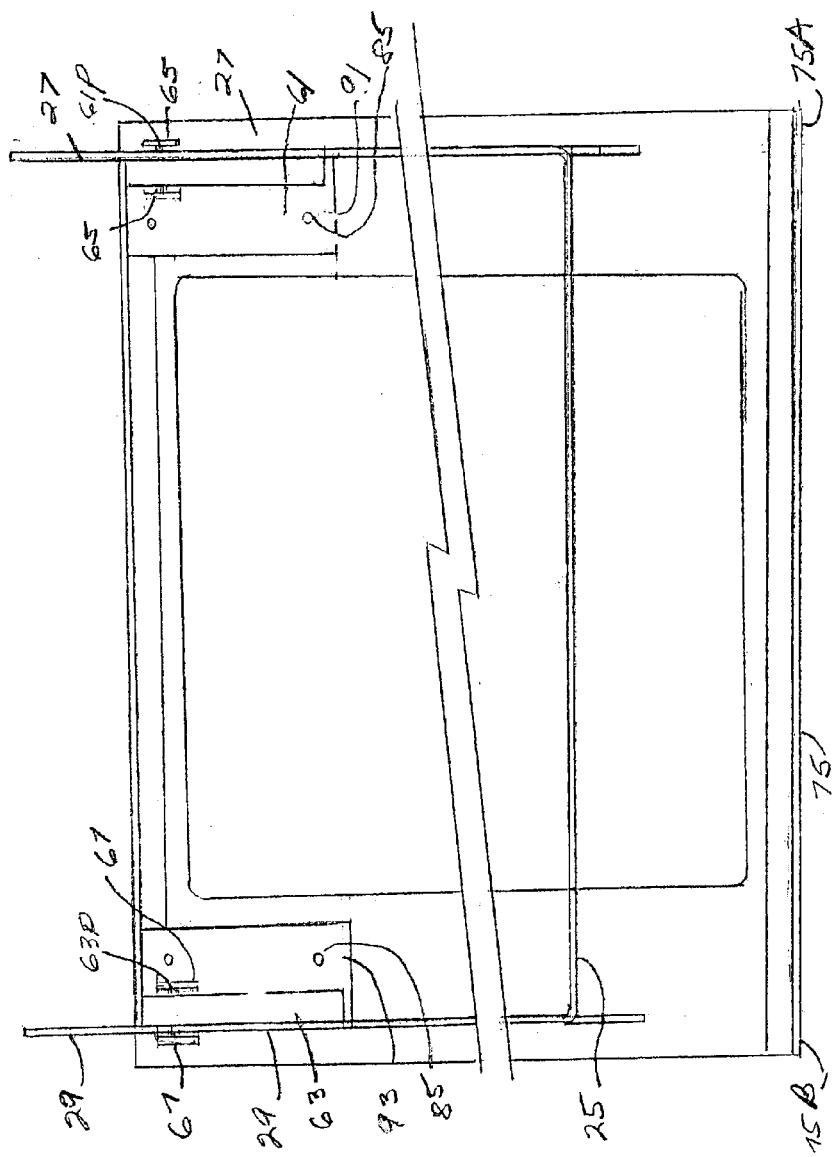
FIG. 9 is a rear view of the apparatus with its cover panel in a partially lower open position.
Figure 10:
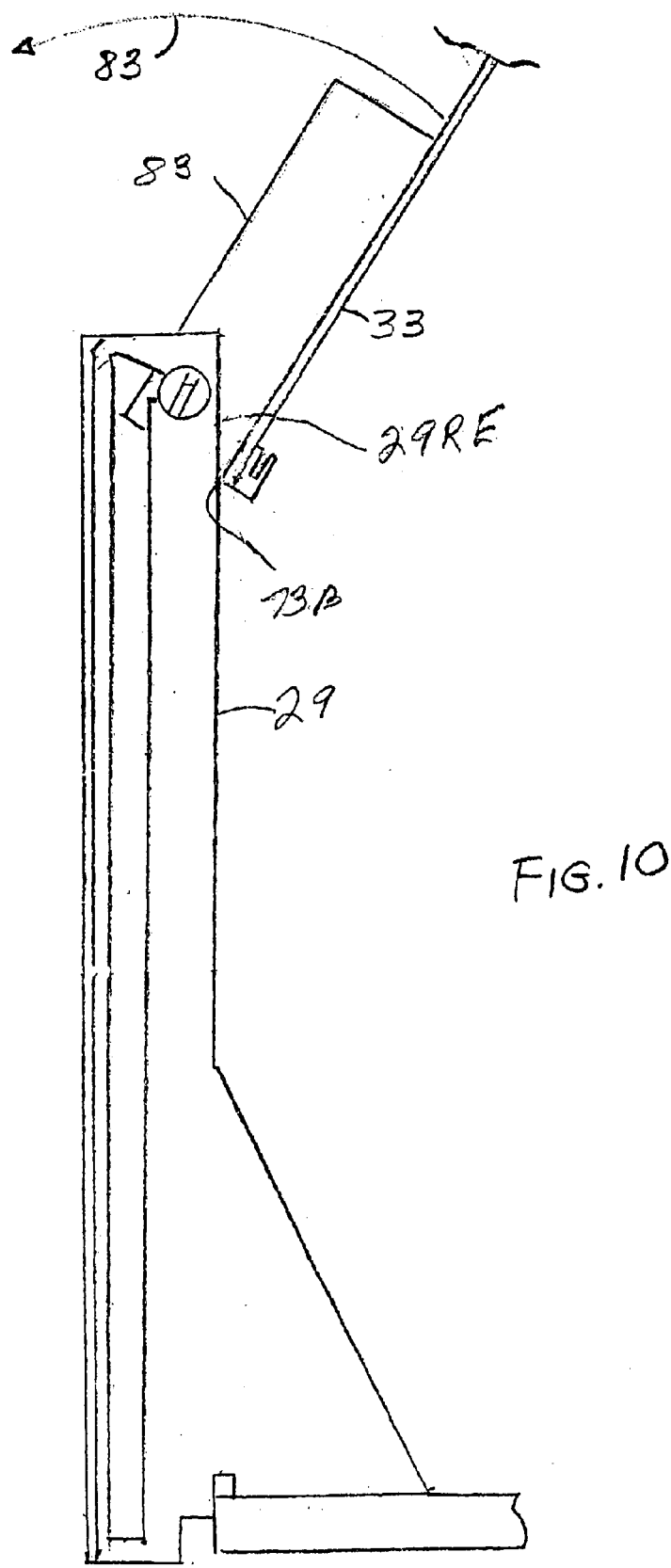
FIG. 10 illustrates the cover panel in an upper open position.
Figure 11:
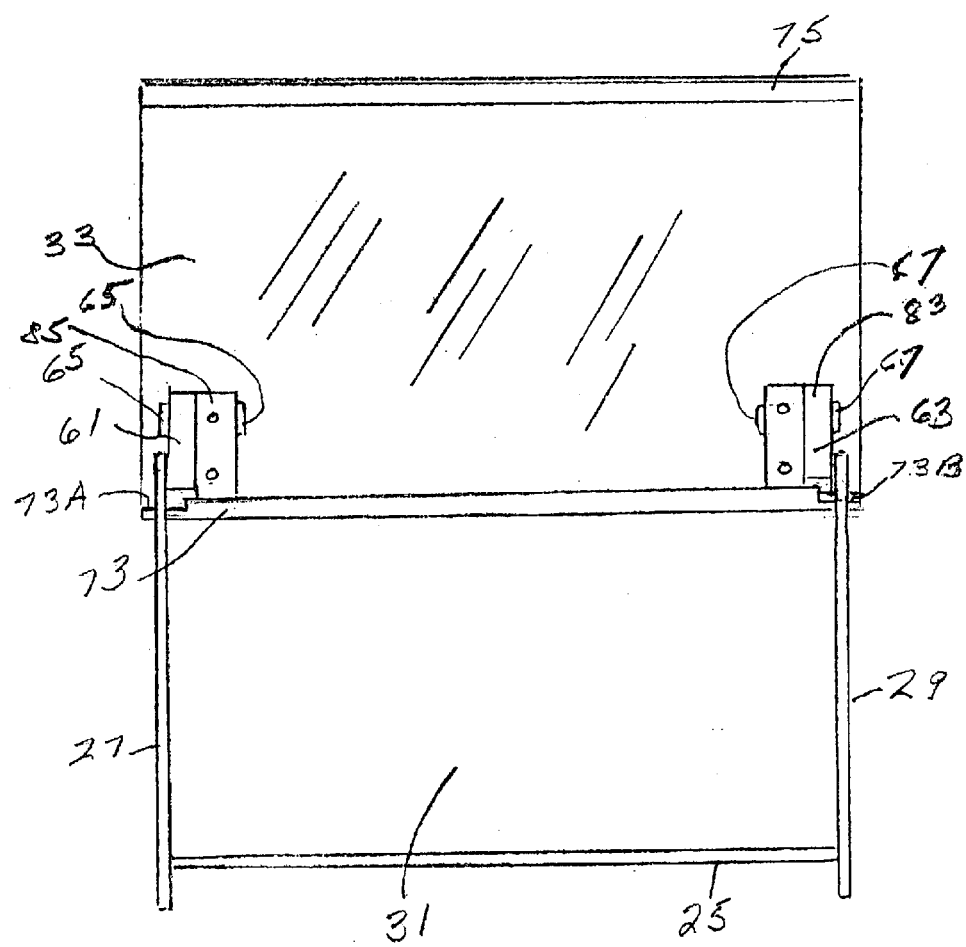
FIG. 11 is a plan front view of the apparatus with its cover in an upper open position.

Referring to FIGS. 10 and 11, the cover panel 33 may also be moved to an upper open position. This can be done by rotating the cover panel 33 in the direction of the arrow 81 (as shown in FIG. 3) relative to the frame 23 from the position of FIGS. 3 and 7 wherein the pins 61P and 63P are in the slot portions 27SAB and 29SAB until the front outer edges 73A and 73B of wall 73 abut against the upper rear edges 27RE and 29RE of the posts 27 and 29 as shown partially in FIG. 10. In this position, the panel 33 will be held in an upper open position. From the upper open position as shown in FIG. 10 the panel 33 can be moved to the closed position shown in FIGS. 3 and 7, by rotating it in the direction of the arrow 83 (as shown in FIG. 10) relative to the frame 23 while the pins 61P and 63P are in the slot portions 27SAB and 29SAB.

Referring to FIG. 7, the cover panel 33 comprises a thin rectangular plastic member 71 having its upper and lower edges secured in slots 73S and 75S of upper and lower plastic walls 73 and 75 respectively. The front of the walls 73 and 75 have open slots 51 and 53 for receiving the upper and lower edges of a thin paper or plastic display or ad if desired.

The pin supports 61 and 63 are secured to plastic plates 91 and 93 which are secured to the back side of the cover panel 33 by rivets 85.

The apparatus 21 has particular usefulness on upper overstock shelves of retail establishments such as department stores, etc. although it is to be understood it could be used on other types of shelves.

In one embodiment, the apparatus 21 may have dimensions of length, height, and depth of about 29.5 inches, 14 inches, and 4.5 inches, respectively, however, these dimensions may vary.

What is claimed is:

1. A cover apparatus for use in combination with a shelf employed for holding items, comprising:
   a frame having a base and first and second spaced apart guide posts coupled to said base defining a U-shaped frame having an opening located between said base and said first and second guide posts with said base being adapted to be secured to the front portion of a shelf such that said first and second guide posts extend upward from said base whereby the shelf may be accessed by way of said opening;
   a cover panel having coupling means coupled to said first and second guide posts to allow movement of said cover panel between a closed position wherein said cover panel is located in front of said opening and a lower open position wherein a substantial portion of said cover panel is located below said frame and a substantial portion of said opening and is uncovered;
   said cover panel may be moved from said closed position to an upper open position wherein said opening is uncovered.

2. A cover apparatus for use in combination with a shelf employed for holding items, comprising:
   a frame having a base and first and second spaced apart guide posts coupled to said base defining a U-shaped frame having an opening located between said base and said first and second guide posts with said base being adapted to be secured to the front portion of a shelf such that said first and second guide posts extend upward from said base whereby the shelf may be accessed by way of said opening;
   a cover panel having coupling means coupled to said first and second guide posts to allow movement of said cover panel between a closed position wherein said cover panel is located in front of said opening and a lower open position wherein a substantial portion of said cover panel is located below said frame and a substantial portion of said opening and is uncovered;
   said cover panel comprises first and second sides edges, a lower edge and an upper edge;
   each of said guide posts comprises an elongated member having an upper end and a lower portion coupled to said base with an elongated slot extending between said lower portion and said upper end;
   said coupling means comprises first and second coupling members with said first coupling member extending through said slot of said first guide post and coupled to an upper portion of said cover panel at said first edge with said second coupling member extending through said slot of said second guide post and coupled to an upper portion of said cover panel at said second edge for allowing said cover panel to move between said upper and lower positions relative to said base and said first and second guide posts;
   each of said elongated slots of said first and second guide posts comprises a transverse portion extending rearward of its said elongated slot to allow said first and second coupling members to be moved rearward to holding positions relative to said elongated slots to hold said cover panel in said upper closed position and to be moved forward from said holding positions into said elongated slots to allow said cover panel to be moved to said lower position.

3. The cover apparatus of claim 2, wherein:
   said cover panel has a front side and a rear side;
   said upper and lower edges of said cover panel comprise upper and lower slots facing each other for receiving opposite edges of a display sheet for holding the display sheet on said front side of said cover panel.

4. The cover apparatus of claim 2, wherein:
   said each of said guide posts comprises a front edge and a rear edge;
   said lower panel may be moved from said closed position, when said first and second coupling members are in said transverse positions of said guide slots of said first and second posts, to an upper open position wherein said upper edge of said cover panel engages said rear edges of said guide posts at their said upper ends, and wherein said opening is uncovered.

* * * * *